United States Patent [19]

Byrne

[11] Patent Number: 5,575,272
[45] Date of Patent: Nov. 19, 1996

[54] ROOFING KETTLE WITH AUTOMATIC FUEL IGNITION AND CONTROL SYSTEM

[75] Inventor: Brian T. Byrne, Chanhassen, Minn.

[73] Assignee: Garlock Equipment Company, Minneapolis, Minn.

[21] Appl. No.: 393,720

[22] Filed: Feb. 24, 1995

[51] Int. Cl.⁶ ........................................... F24H 1/00
[52] U.S. Cl. ........................... 126/343.5 A; 126/374
[58] Field of Search .............. 126/343.5 A, 374; 99/330

[56] References Cited

U.S. PATENT DOCUMENTS

| | | | |
|---|---|---|---|
| 3,252,655 | 5/1966 | Wollner et al. | 126/343.5 A |
| 4,416,614 | 11/1983 | Moody | 126/343.5 A |
| 5,103,801 | 4/1992 | Herring et al. | 126/374 |
| 5,355,841 | 10/1994 | Moore et al. | 122/14 |
| 5,379,683 | 1/1995 | Ejiri et al. | 126/374 |

*Primary Examiner*—Carroll B. Dority
*Attorney, Agent, or Firm*—Alan D. Kamrath; Keith J. Goar

[57] ABSTRACT

Apparatus is described for an improved roofing kettle. The improvements comprise electronic temperature control apparatus for the kettle vat. Automatic shutoff apparatus is provided for shutting off the fuel supply in the event the fuel supply is not properly ignited. Apparatus is provided to shut off the flow of fuel to the kettle in the event the kettle temperature reaches a dangerous level.

10 Claims, 5 Drawing Sheets

ROOFING KETTLE WITH AUTOMATIC FUEL IGNITION AND CONTROL SYSTEM

FIELD OF THE INVENTION

This invention relates to the roofing industry. More particularly, improved roofing kettle apparatus are provided which include means for automatically controlling the kettle temperature during operation, and for automatically shutting down the kettle when unsafe temperatures are reached or when the fuel ignition process fails.

BACKGROUND OF THE INVENTION

The roofing industry has long utilized a variety of roofing kettles for heating roofing material for application to a roof. Such kettles are used primarily in large commercial roofing jobs where large expanses of flat roof are to be covered with liquid asphalt as part of the roofing process. The liquid asphalt is one element of a layering of materials applied to the roof to form a water tight built up roof. The asphalt is heated in the kettle to bring it from a solid form to the desired liquid consistency for application to the roof.

A common feature of all roofing kettles is that they heat the asphalt to a temperature around 450 degrees F. It is at this temperature that the liquid asphalt contains sufficient heat to be pumped by the kettle pump to the roof surface, and subsequently transported by other devices across the roof to the areas where it is dispensed and mopped onto the roof. During such processes, the liquid asphalt loses heat. If the heat losses are too large, the liquid asphalt loses its bonding capability. To avoid this problem, roofers have traditionally heated the liquid asphalt to a relatively high temperature to compensate for cool down during the roofing application. Traditionally the temperatures maintained in the roofing kettles have been within 150 degrees of the temperature at which volatile gases are cooked off the asphalt. Such gases can be very dangerous if they are trapped within the kettle and mixed with a suitable oxygen supply such that a flash fire, or explosion occurs in or about the kettle when an ignition source is present. This has resulted in a tradition of hazardous kettle operation where any number of operating circumstance may lead to asphalt overheating and subsequent asphalt fires and explosions. Unfortunately, many roofing workers have suffered very severe burns, and even death, from such kettle overheating.

Up until the creation of the present invention, no kettles were available which provided overall automated electronic control of kettle ignition and operating temperature. To maintain the kettle at a desired temperature, the kettle operator continually manipulated fuel supply valves to increase and decrease the amount of fuel being burned in response to visual reading of a temperature gauge. This varied the kettle temperature, and, if the kettle were not carefully monitored, frequently lead to kettle overheating and fires. This process was also imprecise and labor intensive. In addition, some electrical shut off systems are presently employed which would totally cut off the supply of fuel to the kettle if it became overheated. However, such system, while providing this additional safety feature, would then have to be manually reignited by the roofers using ignition wands. In addition such systems still left for manual control and manipulation the specific temperature control for the kettle. Thus, while the kettles had the advantage of the shut off safety feature once a dangerous temperature is reached, they still require moment by moment monitoring and gas supply control to maintain a consistent and safe kettle temperature. As a result, a very labor intensive, and highly variable operation has had to be employed in the operation of the thousands of roofing kettles in use today.

SUMMARY OF THE PRESENT INVENTION

In accordance with the present invention there is provided an improved roofing kettle with apparatus for automatically maintaining a very consistent, pre-selected temperature of liquid asphalt being heated in the kettle. In addition, means are provided for automatically shutting down the fuel supply to the kettle if malfunctions occur in the igniting of the kettle burners. Further, a "fail-safe" shut off means is provided for shutting off the kettle fuel supply if for some unpredictable reason, the kettle temperature reaches a predetermined danger level.

The apparatus of this invention, in one embodiment, comprises:

a) A roofing kettle having a liquified gas fuel supply;

b) Control means on the kettle which allow a selected operating temperature to be preset on a control dial;

c) Spark ignition means operably attached to the control means to provide ignition for the liquified fuel;

d) Thermocouple sensing means to monitor the asphalt temperature and, in conjunction with the control means, shut down the fuel supply periodically to maintain the preselected temperature;

e) fuel valve activating means to shut off the fuel supply if the fuel supply is not properly ignited; and f) A fail safe means to shut off fuel to the kettle in the event a preselected temperature danger level is reached in the kettle.

In a preferred embodiment, the roofing kettle is mounted on a wheeled carriage for over the road transport and is attached to a liquified fuel source such as liquified propane ("LP" gas). A fuel control valve controls the fuel supply to the kettle burners. The fuel control valve, being a solenoid control in the preferred embodiment, is governed by an electrical control system including temperature selection and measuring devices. Such devices include a temperature selection knob, monitoring lights, and a temperature measuring thermocouple immersed in the kettle vat. In response to the thermocouple which monitor the asphalt temperature, the control system activates the solenoid control valve to turn the fuel supply on and off. As this occurs, spark igniters reignite the fuel burner jets when the temperature drops below the selected temperature to reignite the kettle burners. An ignition detector is contained in the combustion chambers to determine if ignition takes place when the spark box sends an ignition current. If ignition does not take place after a few second delay period, the fuel supply solenoid is closed as a safety precaution. An additional safety backup is provided by a fail safe shutoff means to shut off the supply of fuel if the kettle temperature exceeds a preset danger point. Such means include a dedicated thermocouple located in the kettle vat. This is operably connected to the control system, and, specifically to a temperature setting circuit which is preset at a temperature above the normal operating range of the kettle, but below what would be considered a dangerous temperature at which to heat the asphalt without danger of a fire or explosion. When activated this shuts off the LP gas supply through a fuel control solenoid valve.

BRIEF DESCRIPTION OF THE DRAWINGS

The invention is described in more detail hereinafter with reference to the accompanying drawings, wherein like reference characters refer to the same parts throughout the several views, and in which.

DETAILED DESCRIPTION OF THE INVENTION

Figure 1:
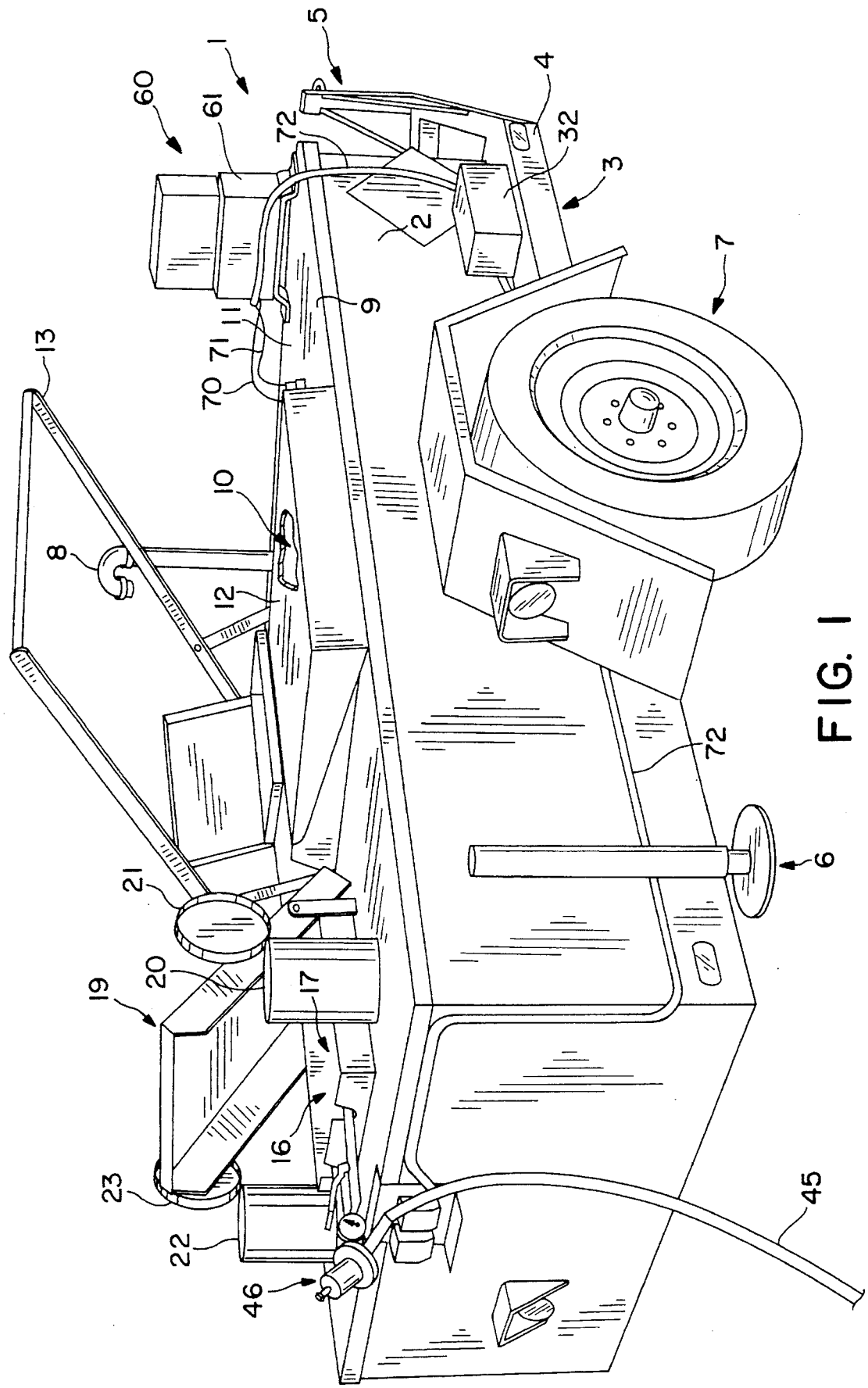
FIG. 1 is a front diagonal perspective view of a roofing kettle embodying the present invention.

In FIG. 1 there is shown in perspective view a roofing kettle incorporating a preferred embodiment of the automatic ignition and temperature control apparatus comprising the present invention. Roofing kettle 1 may generally be of any variety of design and size. Such kettles are used to heat asphalt type roofing materials to a suitable temperature for application to a multi-ply built up roof. The maintenance of a controlled temperature is important in that the materials being used must be applied in a fairly narrow temperature range, and, because the appropriate application temperature is often only 150–200 degrees F. below the temperature at which volatile gases are "cooked off" the tar and could pose a threat of fire or explosion. For instance a well known brand of roofing asphalt manufactured by the Trumbull company specifies an operating temperature of 440 degrees F., and records a flash point for the material of 625 degrees F. Commercial roofing kettles generally have vat capacities ranging from 300 to 1200 gallons. The single lid configuration shown for kettle 1 in the drawings would typically represent a 300–400 gallon kettle.

Figure 5:
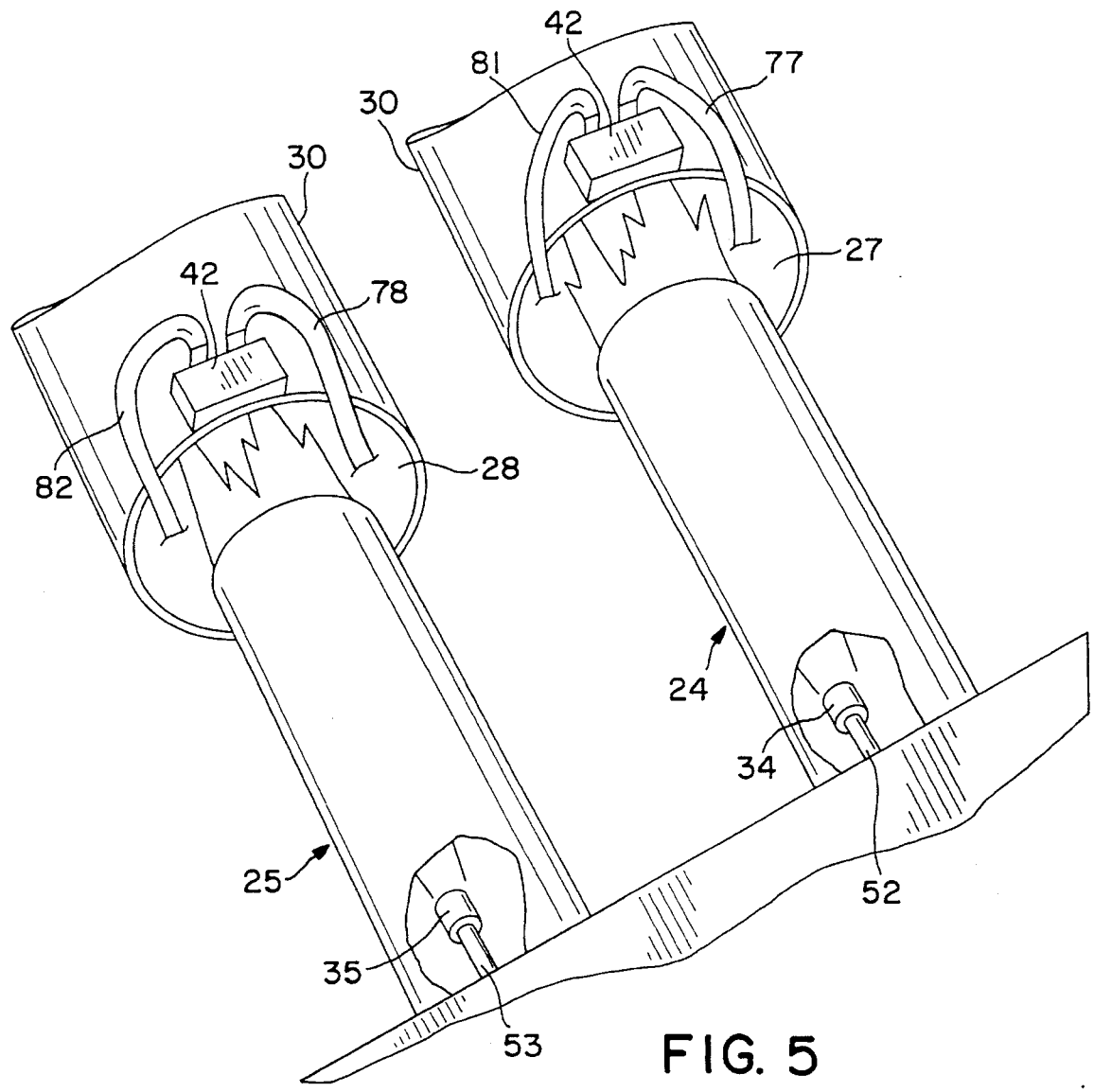
FIG. 5 is a detailed top view of the interior of the burner well showing the ignition components.

Roofing kettle 1 is comprised of a kettle housing 2 carried on a wheeled chassis 3. Wheeled chassis 3 includes a support frame 4 having a hauling hitch 5 attached to it for pulling the kettle to work locations. Transport wheels 7 are provided for over road transport and may be of any standard design. The kettle is maintained in a levelled position at the work site using devices such as levelling stand 6. Housing 2 serves to enclose two generally distinct operational areas of the kettle. One is an internal vat, designated by the numeral 10 in FIG. 1, in which the asphalt is heated. The second is a burner well 16 which is adjacent to vat 10. Burner well 16 is an open cavity in which are positioned combustion chambers, such as those designated by the numerals 24 and 25 in FIG. 5. Such combustion chambers direct a fuel flame into a flue array 30 consisting of a circuit of flue pipes 27 and 28 (not shown in their entirety in the drawings) positioned in the bottom of vat 10 to carry heat throughout the vat. FIG. 5 shows the burner portion of flue array 30 where the ignited fuel is directed into the remainder of the fuel array. Other elements of roofing kettle 1 include a pump supply pipe 8 which would provide means for directing the liquid asphalt to the roof from the ground location of the kettle. An internal pump, not shown, within vat 10 would pump the asphalt through supply pipe 8. Kettle housing 2 includes a top panel 9 which spans the top surface of the kettle. Vat cover 11, as shown in FIG. 1 includes a vat lid 12 which may be raised and lowered using a lid handle 13. It is through vat lid 12 that hard kegs of asphalt are loaded into the kettle for melting after they have been properly broken into football size pieces.

Figure 3:
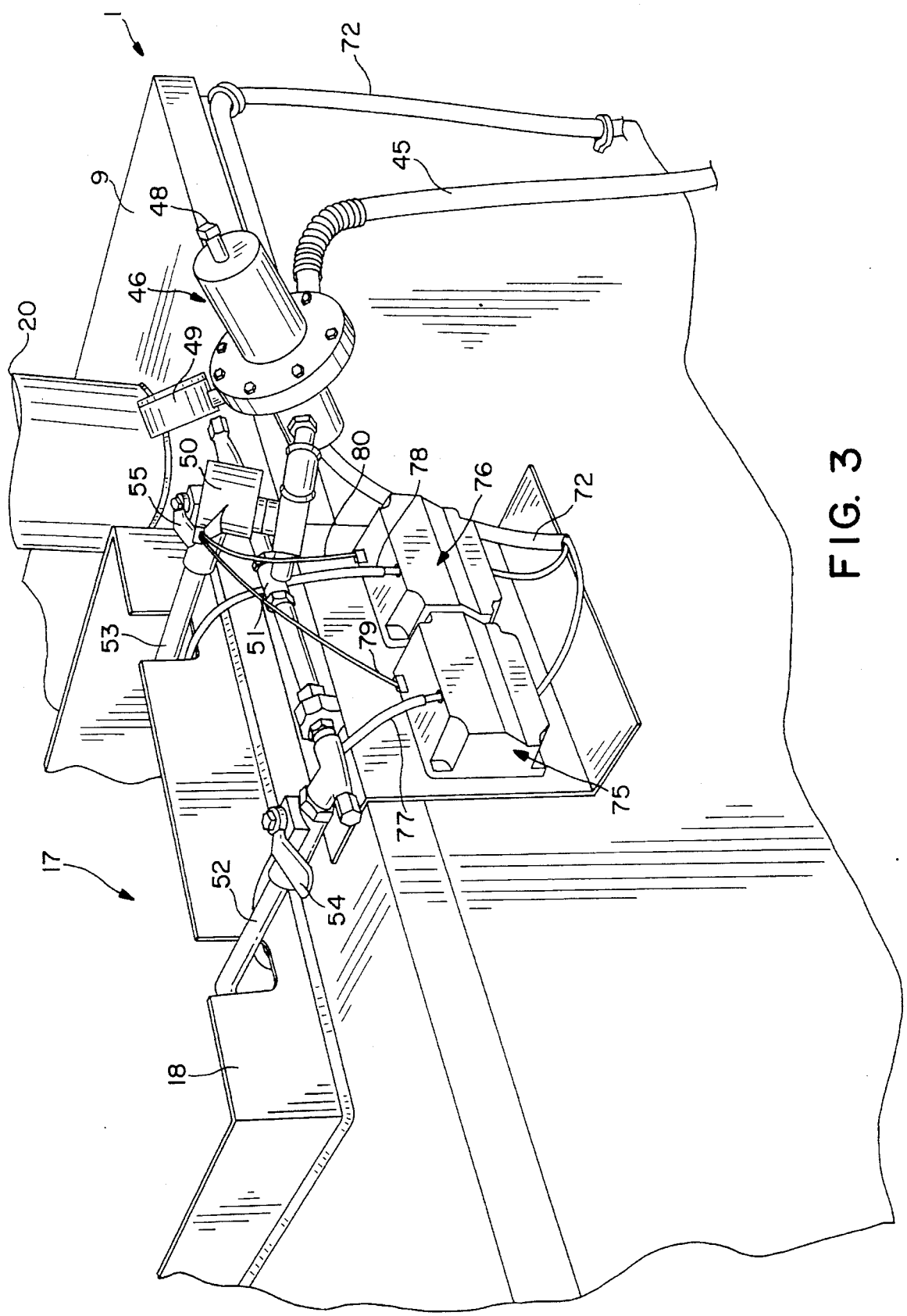
FIG. 3 is a perspective view of one end of the roofing kettle showing components of the fuel control system.

As is shown in FIGS. 1 and 3, burner well 16 has an access opening 17 surrounded by a lid flange 18. A hinged lid 19 fits over flange 18 to allow burner well 16 to be closed off, conserving heat. First and second burner well stacks, 20 and 22, allow the combustion gases circulated through flue array 30 to be vented to outside air. Lids 21 and 23 are attached to the burner stacks 20 and 22, respectively. The forgoing features are typical in commercial roofing kettles and may have any variety of design as is well known in the art.

The present invention relates to a variety of apparatus contained in roofing kettle 1 for controlling and automatically shutting down the fuel source used to heat the asphalt in vat 10. In the preferred embodiment of kettle shown in the drawings, first and second combustion chambers, 24 and 25, within burner well 16 each serve as a combustion housing in which a fuel supply is ignited and directed into flue array 30 which carries heat throughout the base of vat 10 to heat asphalt in the vat. In the preferred embodiment, flue array 30 consists of a steel tube flowing from each of the combustion chambers and having a diameter of several inches which extends to the far end of vat 10 and then loops backward to be vented, thus forming a U-shaped course through which the heated combustion gases flow from each of the combustion chambers.

As is shown in FIG. 5, fuel ignition apparatus are provided in each of combustion chambers 24 and 25. Specifically, each of combustion chambers 24 and 25 has a fuel nozzle, designated by the numerals 34 and 35, respectively. Nozzles 34 and 35 may have any variety of design known in the industry which allows a fuel to mix with oxygen in the combustion chamber and burn continuously when ignited. The heat from the fuel nozzles is directed out of first and second combustion chambers 24 and 25 into flue array 30. By circulating heat through fuel array 30, asphalt in the vat is maintained at the desired temperature to liquify the asphalt.

Figure 2:
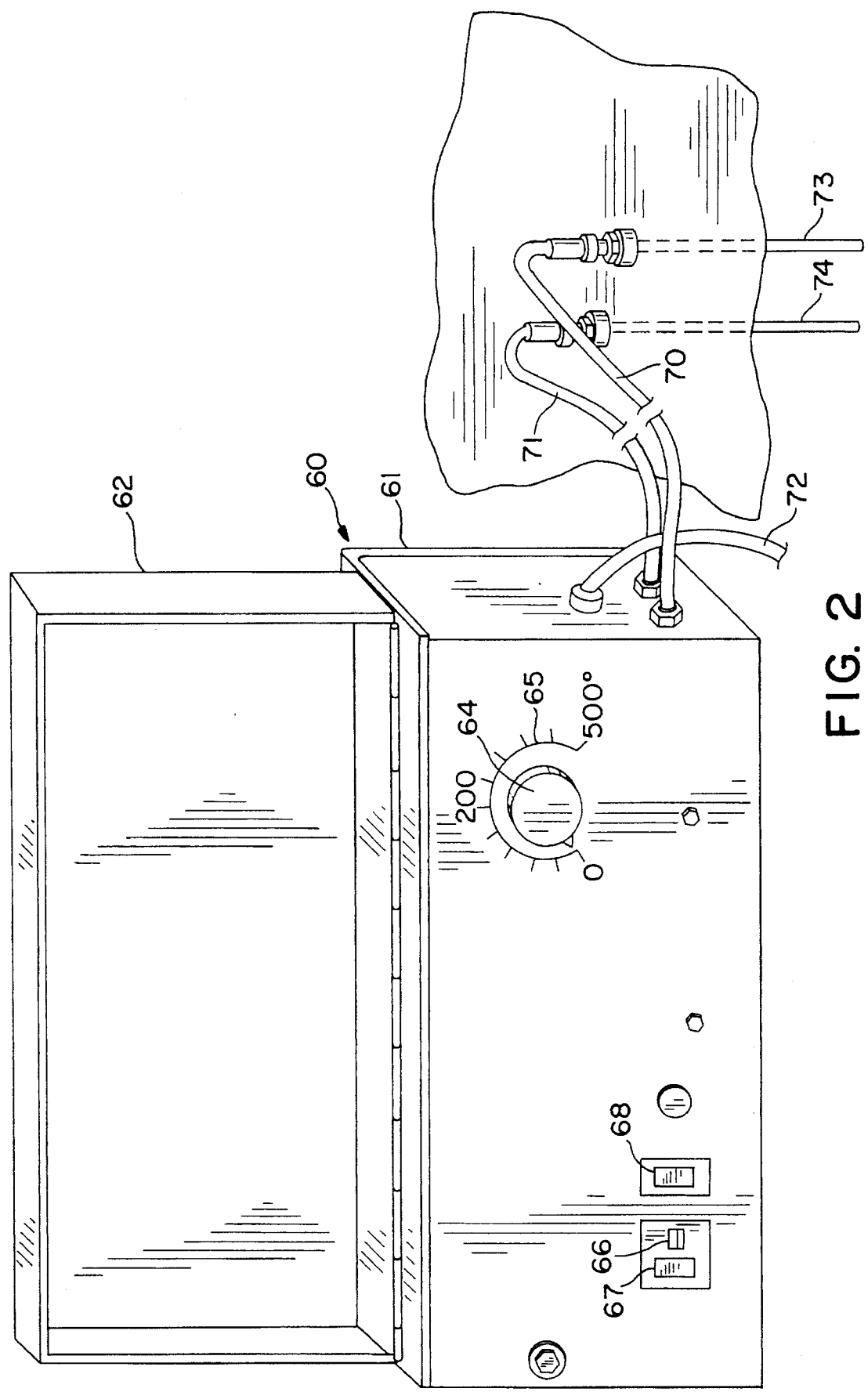
FIG. 2 is a perspective view of the control box.
Figure 6:
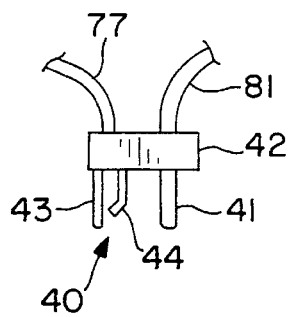
FIG. 6 is a detailed view of the combustion flue spark igniter and thermocouple.

Located in each of combustion chambers 24 and 25 shown in FIG. 5, are first and second ignition means to ignite the fuel which is injected into the combustion chambers by first and second fuel nozzles 34 and 35. In the preferred embodiment, each ignition means has the design depicted in FIG. 6. Specifically, each ignition means is comprised of a mounting bracket 42 attached to combustion chambers 24 and 25 approximately 12 inches downstream from fuel nozzles 34 and 35. Attached to each of mounting brackets 42 are a spark igniter 40 and a flame sensing thermocouple, denoted herein as second temperature sensing thermocouple 41. Spark igniter 40 consists of two opposed electrical leads, 43 and 44, spaced apart such that an electrical current passed between them forms a fuel ignition spark. In the preferred embodiment spark igniters 40 are manufactured by the Fenwal company and identified as model 005-100000-422, and includes second thermocouple 41. Each of thermocouples 41 is a flame sensor and is intended to sense the presence of burning fuel as part of a control mechanism which will be described subsequently. It is the purpose of the first and second ignition means to provide apparatus by which a twelve volt electrical power source provides a spark current across leads 43 and 44 to ignite and reignite the fuel source as the vat temperature periodically drops below the desirable operating temperature due to cool down or due to depletion of the asphalt. Having briefly described the components of roofing kettle 1 and the means provided for electrical fuel ignition, we will now describe the control elements of the present invention. As is shown in FIG. 2, attached to roofing kettle 1 are electrical control means, designated by the numeral 60, to ignite, monitor, and shut down the flow and ignition of fuel to the kettle combustion chambers 24 and 25. Electrical control means 60 include a control console 61 which may be mounted to any visible and accessible portion of roofing kettle 1. Control console 61 has a hingedly attached cover 62 which can be locked to provide security.

Also included in control means 60 is an electrical circuit to operably interconnect first thermocouple 73, electrical power source 32, and temperature selection means whereby a fuel ignition spark is selectively provided to combustion chambers 24 and 25. Mounted in control console 61 are temperature selection means including a temperature setting knob 64, rotatable between a plurality of temperature indicia 65 which is to be set at the operating temperature of the kettle. Temperature setting knob 64 may be of any design, and, in the preferred embodiment is attached to a variable resistor (not shown in the drawings). The variable resistor may be of any commercial design wherein a plurality of resistance values correspond to a plurality of temperatures represented by temperature indicia 65. Igniter switching means are provided wherein a circuit is included, of any design well known in the controller art, whereby igniter switching means are provided to open and close a circuit between the power supply and spark igniters 40. In the preferred embodiment such switching means include an electrical relay, or the equivalent, which is moved between an open and closed position in response to a matching of temperatures sensed by first thermocouple 73 (described subsequently) located in vat 10 and that preselected vat operating temperature set in temperature setting knob 64. This relay opening and closing operably controls the flow of power from the power source 32 to spark igniters 40. In the preferred embodiment temperature setting knob 64 is a model JTC, manufactured by the Watlow company.

For purposes of visually monitoring the operation of fuel control means 60, two lights are provided. As shown in FIG. 2, a blue indicator light 68 is wired into control means 60 and indicates that the vat temperature has reached the temperature preset on setting knob 64. A green power light 67 is provided which indicates when power switching means comprising a power switch 66, providing an open circuit to a power supply means 32 shown in FIG. 1, is in the "on" position. In the preferred embodiment power supply means 32 comprises a twelve volt automobile type battery wired with suitable circuitry well known in the electrical art to the control system elements described herein. In order to provide a temperature input reading to control means 60, a first thermocouple 73 is mounted within the kettle vat 10 through the vat cover 11 as and operably connected to control means 60 by way of thermocouple lead 70 as shown in FIG. 2. Any conventional thermocouple design may be used which allows temperature readings in the desired operating range, with an electrical signal being generated which is calibrated to the temperature being sensed. In the preferred embodiment, a model D631389 thermocouple manufactured by the Durex company is utilized.

A third thermocouple 74 is also immersed in vat 10 to sense vat temperature. Thermocouple 74 may be of any commercially available design and includes a signal generating means to generate an output signal which matches the vat temperature. Included as part of electrical control means 60, thermocouple 74 is operably connected to a maximum temperature selection means to electronically establish an output signal corresponding to a "danger" temperature at which the kettle may be overheated. Specifically, thermocouple 74 is connected to a overheating control means which include a shut off relay circuit in control means 60. The shut off relay circuit (not shown in the drawings) may be of any commercially available type which has the following design features. A variable resistor, or its equivalent, is provided which can be mechanically varied and set. It is set at the time of kettle manufacture. The resistor is adjusted as follows. A thermocouple lead, set at the desired safe operating temperature limit, is operably connected to the relay circuit. The resistor is then adjusted until the relay is found to click open at the temperature at which the thermocouple is "set". The resistor is left at this setting since it corresponds to the desired maximum temperature above which it is desired to have the relay shut off power to the ignition system to close the fuel control valve denying fuel to the overheated kettle. Thus, when thermocouple 74 senses a temperature which corresponds to this preset "danger" temperature, a signal is generated by control means 60 which shuts off the burner fuel supply.

Figure 4:
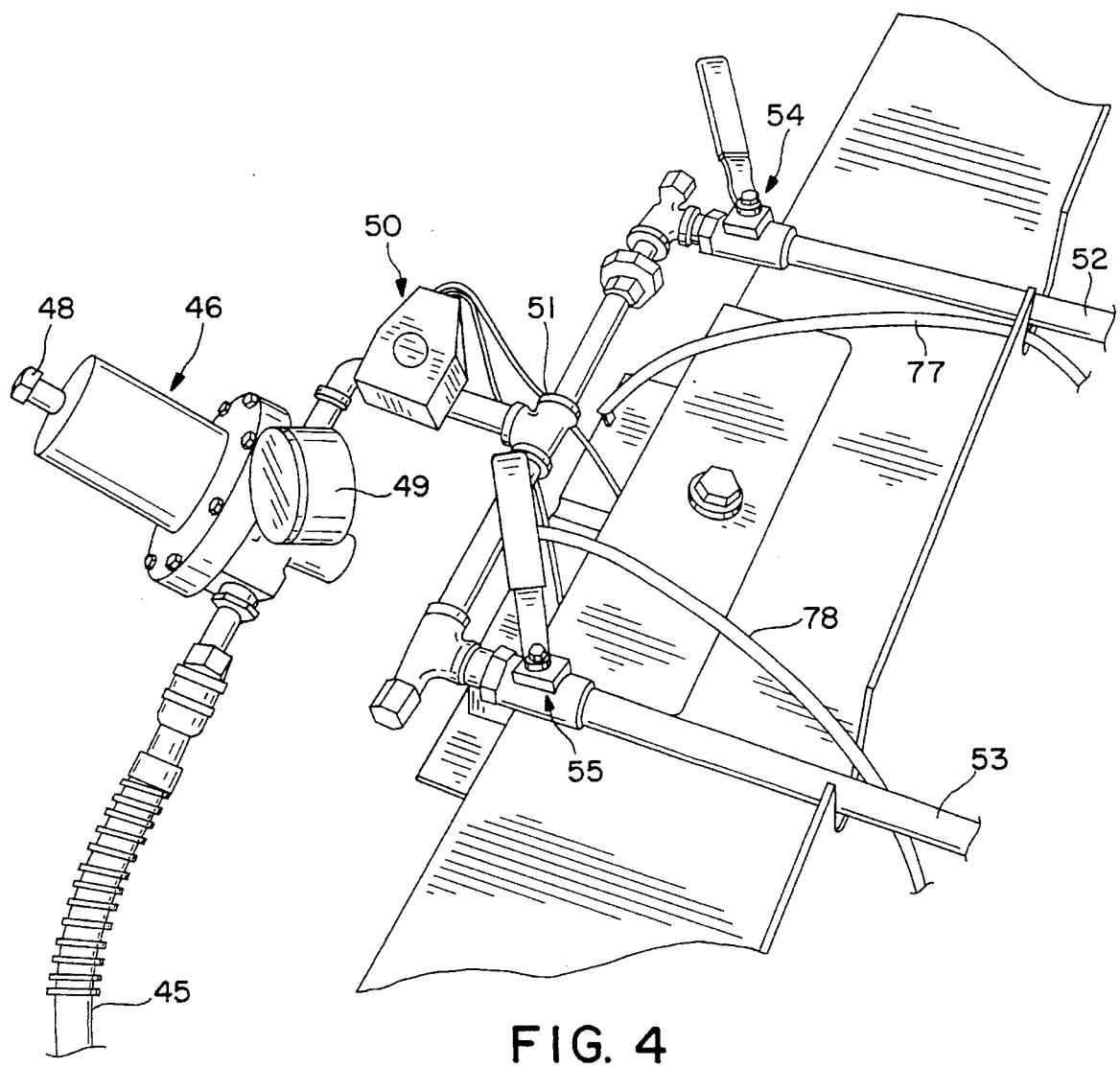
FIG. 4 is a top partial view of the fuel supply and control system.

As is shown in FIGS. 3 and 4, fuel is supplied to roofing kettle 1 by means of a fuel supply line 45. The fuels may be of varying types, but a most common is LP gas supplied from gas cylinders. Fuel supply line 45 connects to a fuel supply pressure regulator 46 which may be of any variety of commercially available design having the following features. The rate of gas flow through pressure regulator 46 is controlled by means of a pressure setting nut 48 protruding from one end of pressure regulator 46. By turning nut 48 in or out the overall flow of fuel through the regulator is varied. The proper setting for setting nut 48 will be determined by the kettle operator based upon the overall level of fuel usage desired, the kettle size and the design and size of fuel nozzles 34 and 35. It has been found that for the preferred embodiment, utilizing a 300–400 gallon capacity kettle 1, a pressure setting of approximately 20 psi is desirable. A pressure gauge, designated by the numeral 49 in FIG. 4, is attached to pressure regulator 46 by which the pressure setting achieved by rotation of pressure setting nut 48 is indicated on the pressure readout dial.

For a two burner kettle such as is described in the preferred embodiment, fuel supply line 45 is split into two lines after exiting pressure regulator 46 utilizing a standard T-fitting, designated by the numeral 51 in FIG. 4. This provides a first fuel supply line 52 for one burner of the kettle, and a second fuel supply line 53 for the second kettle burner, as is shown in FIG. 5. Positioned in each of supply lines 52 and 53 are first supply line valve 54 and second supply line valve 55, respectively. Valves 54 and 55 are used to "fine tune" the flow of fuel to first and second fuel nozzles 34 and 35. It has been found desirable to set first and second supply line valves 54 and 55 at a relatively low flow rate, in a more closed position, when roofing kettle 1 is first being fired up and solidified asphalt is present in the vat. This reduces the overall heat supplied to the vat to avoid "hot spots" being created in the hardened asphalt as it is initially liquified. Then, as the vat contents liquify, vales 54 and 55 would be turned to their full open position to provide the maximum flow of fuel to first and second combustion flues 24 and 25.

An integral part of the present invention are fuel control means comprising a fuel control valve 50 inserted in the fuel supply lines downstream from pressure regulator 46 and upstream of the T-fitting 51, as shown in FIG. 4. Fuel control valve 50 is electrically controlled by a fuel valve switching means which selectively moves the fuel valve from an open position in which fuel flows to the kettle burners, to a closed position in which no fuel would flow to the kettle burners. Fuel control valve 50 includes first and second electrical leads, designated by the numerals 79 and 80 in FIGS. 3 and 4. Leads 79 and 80 are operably connected to first and second spark boxes, 75 and 76, respectively, as shown in FIG. 3. Spark boxes 75 and 76 are commercially available devices for generating an electrical current for purposes of igniting the fuel utilizing a spark generated at each of spark igniters 40 (shown in FIG. 6) located in first and second combustion chambers 24 and 25. In the preferred embodiment spark boxes 75 and 76 are manufactured by the Fenwal company and are identified by model number 05-30.

Having described the various component parts of the fuel control and ignition system of the present invention, its detailed operation will now be described. The present invention has three principal functions. First, it is intended to regulate the fuel supply to roofing kettle 1 to maintain the asphalt temperature in vat 10 at a preselected temperature. Second, it provides means by which the flow of fuel to the combustion flue fuel nozzles is interrupted if the spark igniters 40, shown in FIG. 6, fail for some reason. Thirdly, the supply of fuel to the fuel nozzles is interrupted if the shut off relay circuit previously described senses a temperature at thermocouple 74 which is at a danger temperature at which overheating of the kettle, and fire or explosion, can occur.

Addressing the means and apparatus of the present invention utilized to maintain the vat temperature at a preselected temperature, control cable 72 extends from control console 61 to spark boxes 75 and 76. Electrical control means 60 further include igniter switching means in the form of circuitry of any commercial design well known in the electrical control art and specified as part of the commercially available spark boxes 75 and 76 to provide a closed electrical circuit between power supply 32 and spark igniter 40 when the temperature sensed by first thermocouple 73 is less than the preselected vat operating temperature and an open circuit when the sensed temperature is higher. In the preferred embodiment there is provided a temperature reading range for the vat operating temperature of plus or minus five degrees about the set temperature to allow for normal temperature fluctuations during kettle operation. If the signal sent along control cable 72 is an "on" signal (closed electrical circuit), it causes spark boxes 75 and 76 to generate a spark current to first and second spark cables, 77 and 78 respectively (in FIG. 3) and then to each of spark igniters 40 in first and second combustion chambers 24 and 25, respectively. This spark is then available to ignite any fuel being directed into the combustion chambers 24 and 25 from the fuel nozzles 34 and 35.

Fuel is available for ignition at the time the spark is provided to igniters 40 because the "on" signal sent to spark boxes 75 and 76 also operates a fuel valve activating means to close a circuit between the power supply 32 and fuel control valve 50 to open control valve 50 and allow fuel to flow through first and second fuel supply lines 52 and 53 to fuel nozzles 34 and 35, respectively, where it is ignited by spark igniters 40. Thus, with the sending of the "on" signal from electrical control means 60 indicating that the vat temperature has dropped below the pre-selected vat operating temperature for the vat, fuel is supplied and spark ignition is supplied to ignite the burners in the combustion chambers 24 and 25.

When an "off" signal is sent along control cable 72 by electrical control means 60, indicating that the preselected temperature has been exceeded, a circuit operably connected to spark boxes 75 and 76 opens the circuit between the power supply 32 and fuel control valve 50 to close the valve, cutting off the flow of fuel to fuel nozzles 34 and 35. The fuel remains shut off until the temperature of the vat again drops below the preset temperature, and a spark ignition and a valve opening signal are again sent. This process continues as long as the control means are turned on to maintain roofing kettle 1 at the preset temperature to suitably melt roofing asphalt without the traditional need for continued manual monitoring, and valve control by a workman. It should be noted that when the vat temperature, as measured by the vat thermocouple, is at the preselected vat operating temperature, the blue "ready" light 68 on control console 61 is illuminated to signal the workman that the asphalt is at the preselected temperature.

A further objective of the present invention is to provide apparatus which provide a shut off to fuel when, for any variety of reasons, an ignition source is not present and fuel ignition does not take place. Should this occur, unignited fuel could flow into areas of the kettle where it would randomly ignite or accumulate causing a dangerous condition. This objective is accomplished by means of two thermocouples, each designated herein as a "second thermocouple" and by numeral 41 in FIG. 6. Each of second thermocouples 41 is positioned adjacent to spark igniters 40, shown in detail in FIG. 6 and in their functional position in FIG. 5. Each of second thermocouples 41 is positioned within approximately one inch of a spark igniter 40. Each is connected to one of first and second spark boxes 75 and 76 by means of first ignition sensing lead 81 and second ignition sensing lead 82, respectively. Second thermocouple 41 emits a first activation signal when the fuel supply is, in fact, ignited, producing significant heat, and emits a second measurably different activation signal when the temperature of fuel combustion is not sensed. After a spark ignition signal is sent to spark igniters 40 by electrical control means 60, ignition of fuel should occur as previously described. However, if it does not, and heat is not thereby generated, second thermocouple 41 senses this lack of a suitable temperature level. In this situation, spark boxes 75 and 76 act to shut off fuel control valve 50 to prevent further flow of fuel. Spark boxes 75 and 76 contain time delay circuit means to provide a finite time delay between the initiating of a spark to igniter 40 and the recording of the signal from second thermocouple 41. Such circuitry which has a time delay of approximately ten seconds following generation of the spark generating signal, and, following that delay, if the thermocouple sensors 40 do not sense heat from ignited fuel, the spark boxes send a signal closing fuel control valve 50. In this manner, apparatus is provided which prevents unignited gas from being expelled through first and second combustion flues 24 and 25.

Addressing the apparatus of the present invention which provides a "fail safe" shut off for the kettle heating in the event the kettle reaches a dangerous temperature, there is provided in electrical control means 60 maximum temperature selection means to electronically establish an output signal corresponding to a selected maximum operating temperature for the vat. Such selection means contain a temperature limited circuit which can be mechanically adjusted at a desired maximum operating temperature for the contents of vat 10. This, in turn, controls overheating control means to open and close a power circuit to fuel control valve 50 from power supply 32. This temperature is set at the point of manufacture of roofing kettle 1, as described previously. The temperature would be that temperature at which the kettle manufacturer determined that asphalt heated within the kettle to such temperature could possibly cause the cook off of volatile gases which could ignite or explode, and/or at which the liquid asphalt itself would be in danger of igniting. Electrical control means 60 include overheating control means to move fuel control valve 50 from its open position to its closed position when the output signal of third thermocouple 74 corresponds to a temperature exceeding the output signal of the maximum temperature selection means. Specifically, an electrical circuit, of a design well known in the art, is operably connected both to second thermocouple 74 in vat 10 by way of second thermocouple lead 71, and through spark boxes 75 and 76 to fuel control valve 50. In the event that second thermocouple 74 senses a temperature at or near the maximum operating temperature, a signal is sent along control cable 72 to open the electrical circuit between the power source 32 and fuel control valve 50, closing the valve and preventing further heating of the kettle. In the preferred embodiment the temperature selection means for setting the danger level temperature, being located in control console 61, is manufactured by the Watlow company and identified by model number 80A1-2601-1800.

It should be realized that any variety of design expedients, well known in their specific art areas, may be used to make variations in the design of the preferred embodiment described herein. The preferred embodiment is merely one specific rendition of what may be a wide variety of specific embodiments that may be constructed incorporating the present invention.

What is claimed is:

1. An improved roofing kettle having a vat for heating roofing asphalt, a fuel source, and a combustion chamber operably connected to the fuel source to provide heat to the vat, the improvements comprising, in combination:

a) an electrical power source;

b) temperature selection means to electronically select a vat operating temperature, said temperature selection means including a plurality of temperature indicia; said temperature selection means being selectively positionable at a preselected vat operating temperature;

c) a first thermocouple positioned within the kettle vat;

d) spark ignition means to generate a fuel igniting spark when electrical current is supplied thereto, said spark ignition means being operably connected to said electrical power source; said spark ignition means further including a spark igniter positioned adjacent the kettle combustion chamber;

e) a third thermocouple, said third thermocouple being positioned in the kettle vat, said third thermocouple including signal generating means to generate an output signal which is correlated to the vat temperature;

f) a fuel control valve functionally positioned between the fuel source and the combustion chamber, said fuel control valve having an open position wherein fuel passes from the fuel supply to the combustion chamber and a closed position wherein fuel is prevented from passing from the fuel supply to the combustion chamber; and g) electrical control means to operably interconnect said first thermocouple, said third thermocouple, said fuel control valve, said electrical power source, said temperature selection means and said spark ignition means; said electrical control means further comprising:

i) igniter switching means to provide a closed electrical circuit between said electrical power source and said spark igniter when the temperature sensed by said first thermocouple is less than said preselected vat operating temperature, and to provide an open electrical circuit between said electrical power source and said spark igniter when the temperature sensed by said first thermocouple is greater than said preselected vat operating temperature;

ii) maximum temperature selection means to electronically establish an output signal corresponding to a selected maximum operating temperature for the vat;

iii) overheating control means to move said fuel control valve from said open position to said closed position when said third thermocouple output signal corresponds to a temperature exceeding said maximum temperature selection means output signal, thereby shutting off the flow of fuel from the fuel source to the kettle combustion chamber preceding overheating of the kettle; and iv) fuel valve switching means to electronically switch said fuel control valve between said fuel control valve open position and said fuel control valve closed position.

2. The improved roofing kettle of claim 1, further comprising, in combination:

a) a second thermocouple, said second thermocouple being positioned adjacent said spark igniter, said second thermocouple emitting a first activation signal when the fuel supply is ignited in the combustion chamber and a second activation signal when the fuel supply is not ignited in the combustion chamber; and b) said electrical control means further comprising:

i) fuel valve activating means to move said fuel valve switching means from said open position to said closed position when said second thermocouple emits said second activation signal indicating that the fuel supply has not been ignited.

3. The improved roofing kettle of claim 1, wherein:

a) said temperature selection means is further comprised of:

i) a temperature setting knob, said temperature setting knob being moveable between each of said temperature indicia;

ii) a variable electrical resistor functionally connected to said temperature setting knob;

iii) said variable electrical resistor containing a plurality of resistance values, each of said resistance values being calibrated to correspond to one of said temperature indicia;

b) said electrical power source is an electrical storage battery;

c) said electrical control means further comprise;

i) power switching means to selectively provide power to said spark ignition means from said electrical power source, said power switching means including an electrical power switch moveable from an open to a closed position;

ii) an indicator light; and iii) light illumination means to illuminate said indicator light when said power switching means electrical switch is in said closed position.

4. An improved roofing kettle having a vat for heating roofing asphalt, a fuel source, and a combustion chamber operably connected to the fuel source to provide heat to the vat, the improvements comprising, in combination:

a) an electrical power source;

b) temperature selection means to electronically select a vat operating temperature, said temperature selection means being selectively positionable at a preselected vat operating temperature, said temperature selection means comprising:

i) a plurality of temperature indicia;
   ii) a temperature setting knob, said temperature setting knob being moveable between each of said temperature indicia;
   iii) a variable electrical resistor functionally connected to said temperature setting knob; and
   iv) said variable electrical resistor containing a plurality of resistance values, each of said resistance values being calibrated to correspond to one of said temperature indicia;
c) a first thermocouple positioned within the kettle vat;
d) spark ignition means to generate a fuel igniting spark when electrical current is supplied thereto, said spark ignition means being operably connected to said electrical power source; said spark ignition means further including a spark igniter positioned adjacent the kettle combustion chamber;
e) electrical control means for operably interconnecting said first thermocouple, said electrical power source, said temperature selection means and said spark ignition means; said electrical control means further comprising:
   i) igniter switching means to provide a closed electrical circuit between said electrical power source and said spark igniter when the temperature sensed by said first thermocouple is less than said preselected vat operating temperature, and to provide an open electrical circuit between said electrical power source and said spark igniter when the temperature sensed by said first thermocouple is greater than said preselected vat operating temperature;
f) a second thermocouple, said second thermocouple being positioned adjacent said spark igniter, said second thermocouple emitting a first activation signal when the fuel supply is ignited in the combustion chamber and a second activation signal when the fuel supply is not ignited in the combustion chamber;
g) a fuel control valve functionally positioned between the fuel source and the combustion chamber, said fuel control valve having an open position wherein fuel passes from the fuel supply to the combustion chamber and a closed position wherein fuel is prevented from passing from the fuel supply to the combustion chamber;
h) said electrical control means further comprising:
   i) fuel valve switching means to electronically switch said fuel control valve between said fuel control valve open position and said fuel control valve closed position;
   ii) fuel valve activating means to move said fuel valve switching means from said open position to said closed position when said second thermocouple emits said second activation signal indicating that the fuel supply has not been ignited;
i) a third thermocouple, said third thermocouple being positioned in the kettle vat; said third thermocouple including signal generating means to generate an output signal which is correlated to the vat temperature; and
j) said electrical control means further comprising:
   i) maximum temperature selection means to electronically establish an output signal corresponding to a selected maximum operating temperature for the vat; and
   ii) overheating control means to move said fuel control valve from said open position to said closed position when said third thermocouple output signal corresponds to a temperature exceeding said maximum temperature selection means output signal, thereby shutting off the flow of fuel from the fuel source to the kettle combustion chamber preceding overheating of the kettle.

5. The improved roofing kettle of claim 4, wherein:
a) said electrical control means further comprise:
   i) power switching means to selectively provide power to said spark ignition means from said electrical power source, said power switching means including an electrical switch moveable from an open to a closed position;
   ii) an indicator light; and
   iii) light illumination means to illuminate said indicator light when said power switching means electrical switch is in said closed position.

6. The improved roofing kettle of claim 5 wherein said electrical power source is an electrical storage battery.

7. The improved roofing kettle of claim 4 wherein said electrical power source is an electrical storage battery.

8. The improved roofing kettle of claim 1 wherein said electrical power source is an electrical storage battery.

9. The improved roofing kettle of claim 1, wherein:
a) said electrical control means further comprise:
   i) power switching means to selectively provide power to said spark ignition means from said electrical power source, said power switching means including an electrical switch moveable from an open to a closed position;
   ii) an indicator light; and
   iii) light illumination means to illuminate said indicator light when said power switching means electrical switch is in said closed position.

10. The improved roofing kettle of claim 1, wherein:
a) said temperature selection means is further comprised of:
   i) a temperature setting knob, said temperature setting knob being moveable between each of said temperature indicia;
   ii) a variable electrical resistor functionally connected to said temperature setting knob; and
   iii) said variable electrical resistor containing a plurality of resistance values, each of said resistance values being calibrated to correspond to one of said temperature indicia.

\* \* \* \* \*